US011987379B2

(12) United States Patent
Rowan (10) Patent No.: US 11,987,379 B2
(45) Date of Patent: May 21, 2024

(54) METHODS, DEVICES, AND SYSTEMS FOR RECORDING A FLIGHT SEGMENT (71) Applicant: Chris Rowan, Reno, NV (US)

(72) Inventor: Chris Rowan, Reno, NV (US)

( * ) Notice: Subject to any disclaimer, the term of this patent is extended or adjusted under 35 U.S.C. 154(b) by 195 days.

(21) Appl. No.: 17/816,025

(22) Filed: Jul. 29, 2022

(65) Prior Publication Data
US 2023/0030733 A1 Feb. 2, 2023

Related U.S. Application Data (63) Continuation of application No. PCT/US2022/074291, filed on Jul. 29, 2022.

(51) Int. Cl.
*B64D 45/00* (2006.01)
*G06F 3/0484* (2022.01)
*H04W 4/42* (2018.01)

(52) U.S. Cl.
CPC ........... *B64D 45/00* (2013.01); *G06F 3/0484* (2013.01); *H04W 4/42* (2018.02); *B64D 2045/0085* (2013.01)

(58) Field of Classification Search
CPC ............ B64D 45/00; B64D 2045/0085; G06F 3/0484; H04W 4/42; H04W 4/44
See application file for complete search history.

(56) References Cited

U.S. PATENT DOCUMENTS

| | | | | |
|---|---|---|---|---|
| 6,885,340 B2* | 4/2005 | Smith | ..................... | G01S 13/86 342/465 |
| 7,158,978 B2* | 1/2007 | Goodwin | ............ | G06F 11/1446 707/999.1 |
| 7,203,630 B2* | 4/2007 | Kolb | ..................... | G07C 5/085 703/6 |
| 8,374,733 B2* | 2/2013 | Dexheimer | ............ | G06Q 50/40 340/963 |
| 8,386,100 B1 | 2/2013 | Lie | | |
| 8,700,236 B1 | 4/2014 | Berman | | |
| 2002/0103865 A1* | 8/2002 | Lilly | ..................... | H04L 67/01 709/205 |
| 2010/0073197 A1* | 3/2010 | Eagleton | ................. | H04Q 9/00 340/945 |
| 2010/0152924 A1 | 6/2010 | Pandit et al. | | |

(Continued)

OTHER PUBLICATIONS

ISA/US, International Search Report and Written Opinion for corresponding PCT Patent Application No. PCT/US2022/074291, mailed Oct. 27, 2022, 7 pages.

(Continued)

*Primary Examiner* — Mussa A Shaawat
(74) *Attorney, Agent, or Firm* — NK Patent Law (57) ABSTRACT

Disclosed herein are methods, devices, and systems for facilitating pilots in determining current and predicted performance specifications of their aircraft. According to one embodiment, a method is implemented on a mobile computing device. The method includes receiving static pilot data, receiving static aircraft data associated with an aircraft, receiving dynamic aircraft data over a time period, determining aircraft performance data based on the static aircraft data and the dynamic aircraft data, providing the aircraft performance data to a graphical user interface (GUI) associated with the mobile computing device, and storing the static pilot data and the aircraft performance data.

20 Claims, 4 Drawing Sheets (56) References Cited

U.S. PATENT DOCUMENTS

| | | | | |
|---|---|---|---|---|
| 2011/0040428 | A1* | 2/2011 | Dexheimer | G06Q 10/06 |
| | | | | 701/3 |
| 2011/0246000 | A1* | 10/2011 | Shavit | G08G 5/0026 |
| | | | | 701/14 |
| 2015/0079545 | A1* | 3/2015 | Kurtz | G06F 21/32 |
| | | | | 434/30 |
| 2015/0177032 | A1 | 6/2015 | Schober et al. | |
| 2016/0019795 | A1 | 1/2016 | Chircop et al. | |
| 2016/0117946 | A1* | 4/2016 | Mendro | G09B 9/003 |
| | | | | 434/35 |
| 2016/0275219 | A1* | 9/2016 | Feuer | G06F 17/18 |
| 2016/0358498 | A1* | 12/2016 | Fucke | G09B 9/20 |
| 2017/0287358 | A1* | 10/2017 | Gauthier | G09B 5/02 |
| 2021/0192411 | A1* | 6/2021 | Conaway | G06F 3/0484 |

OTHER PUBLICATIONS

Duerr, A. E. et al.: "Testing an Emerging Paradigm in Migration Ecology Shows Surprising Differences in Efficiency between Flight Modes", PLOS ONE, Apr. 2012, vol. 7, Issue 4, e35548, pp. 1-7.
FAA Aviation Safety: "FAASTeam Safer Skies Through Education—Aircraft Performance Monitoring", 2020, 2 pages.
WIPO, International Preliminary Report on Patentability for corresponding PCT Patent Application No. PCT/US2022/074291, dated Jan. 18, 2024, 6 pages.

\* cited by examiner

METHODS, DEVICES, AND SYSTEMS FOR RECORDING A FLIGHT SEGMENT

PRIORITY CLAIM

This application is a continuation application of PCT Patent Application No. PCT/US2022/074291, filed Jul. 29, 2022, which claims priority to U.S. Provisional Patent Application Ser. No. 63/226,880, filed Jul. 29, 2021, the disclosures of all of which are incorporated herein by reference in their entireties.

TECHNICAL FIELD

The present invention relates to a mobile device application and more specifically to methods, devices, and systems using mobile devices for recording flight segments and predicting future flight performances under conditions (e.g. higher altitudes, heights, weather, etc.) not previously experienced.

BACKGROUND

General aviation continues to be popular with the associated aircraft having very extended lifetimes. For example, such an aircraft may remain in service for 50 years or more. Additionally, the performance or operational information of these aircraft may change over time from aging effects and modifications. For example, performance data may be provided by a Pilot Operating Handbook (POH), an Aircraft Flight Manual (AFM), or the like. Typically, this performance data is produced using a new aircraft flown by a test pilot under near ideal conditions. Also, these aircraft may be used in locations (e.g. altitudes and runway conditions) and weather conditions where the performance criterion is unknown to the pilot. Such issues are present in commercial and military aviation, and may eventually be presented in drone aviation.

Accordingly, a need exists to better facilitate pilots in determining current and predicted performance specifications of their aircraft under conditions not previously experienced by the aircraft and/or pilot.

SUMMARY

The presently disclosed subject matter is directed toward methods, devices, and systems for facilitating pilots in determining current and predicted performance specifications of their aircraft.

According to one embodiment, a method is implemented on a mobile computing device. The method includes receiving static pilot data, receiving static aircraft data associated with an aircraft, receiving dynamic aircraft data over a time period, determining aircraft performance data based on the static aircraft data and the dynamic aircraft data, providing the aircraft performance data to a graphical user interface (GUI) associated with the mobile computing device, and storing the static pilot data and the aircraft performance data.

In some embodiments, the mobile computing device may be a smart phone, a smart tablet, or the like. In certain embodiments, the mobile computing device may be an iPhone®, iPad®, or the like.

In some embodiments, the mobile computing device may include at least one version of an Android® operating system (OS) or other OS supported by the mobile device.

In some embodiments, the method may be performed by an application specific program. In certain embodiments, the application specific program may be at least one of an iOS® app, an Android® OS app, or the like.

In some embodiments, the static pilot data may include a pilot name and logged flight hours. Other static pilot data may include type of aircraft flown, etc.

In some embodiments, the static pilot data may be provided by the GUI associated with the mobile computing device. In other embodiments, the static pilot data may be provided by a remote server over a wide area network (WAN). The remote server may be a portion of a networked computing environment. The networked computing environment may be a cloud computing environment. In certain embodiments the remote server may be a virtualized server. The WAN may be compliant to at least one version of the 2G standard, the 3G standard, the 4G standard, the 5G standard, and/or the like.

In some embodiments, the static aircraft data may be provided by the GUI associated with the mobile computing device. In other embodiments, the static aircraft data may be provided by a remote server over a WAN. The static aircraft data may include the type of data found in a Pilot Operating Handbook (POH), an Aircraft Flight Manual (AFM), or the like.

In some embodiments, the method may further include providing the aircraft performance data to a remote server over a wide area network (WAN). In certain embodiments, the method further includes providing dynamic aircraft data to the remote server over a wide area network (WAN).

In some embodiments, the mobile computing device may be in a fixed position relative to at least one of a yaw axis, a pitch axis, and a roll axis of the aircraft during the time period. In certain embodiments, the mobile computing device may be in a fixed position relative to a yaw axis, a pitch axis, and a roll axis of the aircraft during the time period.

In some embodiments, the aircraft performance data may include pitch data, yaw data, and roll data over the time period. In certain embodiments, the aircraft performance data may include vibration data, linear acceleration data, and/or the like.

In some embodiments, the aircraft performance data may include velocity data and altitude data over the time period.

In some embodiments, the aircraft performance data may include at least one of rate of climb data and rate of descent data over the time period.

In some embodiments, the method may further include receiving weather data associated with the time period.

In some embodiments, the weather data may be provided by a weather server over a wide area network (WAN). In certain embodiments, the weather data may be further provided by at least one of a National Weather Service application programming interface (API), an OpenWeatherMap API, a Weatherbit API, an AccuWeather API, a Dark Sky API, a Weather2020 API, a ClimaCell API, a Visual Crossing API, a AerisWeather API, and/or the like.

In some embodiments, determining the aircraft performance data may be further based on the weather data.

In some embodiments, the method may further include receiving airport data.

In some embodiments, determining the aircraft performance data may be further based on the airport data.

In some embodiments, the airport data may be provided by the GUI associated with the mobile computing device. In other embodiments, the airport data may be provided by a remote server over a WAN.

In some embodiments, the method may further include requesting the airport data from the remote server based on current location data of the mobile computing device. In certain embodiments, the current location data may be provided by a global positioning system (GPS) receiver embedded within the mobile computing device.

In some embodiments, a first portion of the dynamic aircraft data may be provided by a plurality of mobile device sensors embedded in the mobile computing device.

In some embodiments, a second portion of the dynamic aircraft data may be provided by a personal area network (PAN) connection. In certain embodiments, the PAN may be compliant to at least one version of the Bluetooth® standard.

In some embodiments, the second portion of the dynamic aircraft data may be further provided by an aviation navigation system embedded within the aircraft.

In some embodiments, the second portion of the dynamic aircraft data may be further provided by a mobile high performance sensor device.

In some embodiments, the plurality of mobile device sensors may include at least one of a global positioning system (GPS) receiver, an accelerometer, an electronic compass, a barometer, a microphone, and an orientation detector.

In further embodiments, the plurality of mobile device sensors may include at least two of a global positioning system (GPS) receiver, an accelerometer, an electronic compass, a barometer, a microphone, and an orientation detector.

In still further embodiments, the plurality of mobile device sensors may include at least three of a global positioning system (GPS) receiver, an accelerometer, an electronic compass, a barometer, a microphone, and an orientation detector.

In some embodiments, the method may further include receiving dynamic pilot data.

In some embodiments, determining the aircraft performance data may be further based on the dynamic pilot data.

In some embodiments, the dynamic pilot data may be provided in near real time by a wearable health monitoring device.

In some embodiments, the dynamic pilot data may include a least one of pilot heart rate data, pilot heart rate variability (HRV) data, pilot skin perspiration data, pilot skin temperature data, and pilot oxygen saturation data.

In some embodiments, the dynamic pilot data may include pilot wrist based orientation data.

In some embodiments, the dynamic pilot data may include pilot wrist based position three axis accelerometer data.

In some embodiments, the dynamic pilot data is provided over a personal area network (PAN). In certain embodiments, the PAN may be compliant to at least one version of the Bluetooth® standard.

In some embodiments, the time period is representative of an entire flight including a plurality of legs. In other embodiments, the time period is representative of a leg of an entire flight having a plurality of legs. In other embodiments, the time period may be representative of a takeoff. In other embodiments, the time period may be representative of a descent, a final approach, and a landing.

In some embodiments, the aircraft performance data may include turbulence data over the time period. The turbulence data may include quantitative turbulence data and/or qualitative turbulence data. Additionally, the turbulence data may include turbulence location data.

The method may further include providing the turbulence data to a remote server over a WAN. Additionally, the remote server may be configured for receiving a plurality of turbulence datasets from a plurality of aircraft and generating turbulence mapping data in near-real-time associated with the plurality of turbulence datasets. In further embodiments, the method may further include receiving the turbulence mapping data and displaying the turbulence mapping data on the GUI.

In some embodiments, the aircraft performance data may include wind data over the time period. The wind data may include quantitative wind data and/or qualitative wind data. Additionally, the wind data may include wind location data.

The method may further include providing the wind data to a remote server over a WAN. The remote server may be configured for receiving a plurality of wind datasets from a plurality of aircraft and generating wind mapping data in near-real-time associated with the plurality of wind datasets. In further embodiments, the method may further include receiving the wind mapping data and displaying the wind mapping data on the GUI.

In some embodiments, the mobile computing device may be configured for installation within a cockpit of the aircraft. In further embodiments, the mobile computing device may be at least a portion of an aircraft navigation system. In still further embodiments, the method may further include receiving at least a portion of the dynamic aircraft data over an internal communication bus within the aircraft.

In some embodiments, the internal communication bus may be compliant with at least one version of a Controller Area Network (CAN) data bus standard. In other embodiments, the internal communication bus may be compliant with at least one version of an ARINC 429 standard, an ARINC 629 standard, or a MIL-STD-1553 standard.

In still other embodiments, the internal communication bus may be compliant with at least one version of a Commercial Standard Digital Bus (CSDB) standard or an Avionics Serial Communication Bus (ASCB) standard. In certain embodiments, the internal communication bus may be an optical communication bus.

In another embodiment a mobile computing device is disclosed for facilitating pilots in determining current and predicted performance specifications of their aircraft. The mobile computing device includes a memory, a database and a processor. The processor is configured to perform a method. The method includes receiving static pilot data, receiving static aircraft data associated with an aircraft, receiving dynamic aircraft data over a time period, determining aircraft performance data based on the static aircraft data and the dynamic aircraft data, providing the aircraft performance data to a graphical user interface (GUI) associated with the mobile computing device, and storing the static pilot data and the aircraft performance data.

In another embodiment a non-transitory computer readable medium is disclosed for facilitating pilots in determining current and predicted performance specifications of their aircraft. The non-transitory computer readable medium includes a plurality of machine-readable instructions which when executed by one or more processors of a server are adapted to cause the server to perform a method. The method includes receiving static pilot data, receiving static aircraft data associated with an aircraft, receiving dynamic aircraft data over a time period, determining aircraft performance data based on the static aircraft data and the dynamic aircraft data, providing the aircraft performance data to a graphical user interface (GUI) associated with the mobile computing device, and storing the static pilot data and the aircraft performance data.

The features and advantages described in this summary and the following detailed description are not all-inclusive. Many additional features and advantages will be apparent to one of ordinary skill in the art in view of the drawings, specification, and claims presented herein.

BRIEF DESCRIPTION OF THE DRAWINGS

The present embodiments are illustrated by way of example and are not intended to be limited by the figures of the accompanying drawings. In the drawings.

DETAILED DESCRIPTION

The following description and drawings are illustrative and are not to be construed as limiting. Numerous specific details are described to provide a thorough understanding of the disclosure. However, in certain instances, well-known or conventional details are not described in order to avoid obscuring the description.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Figure 1:
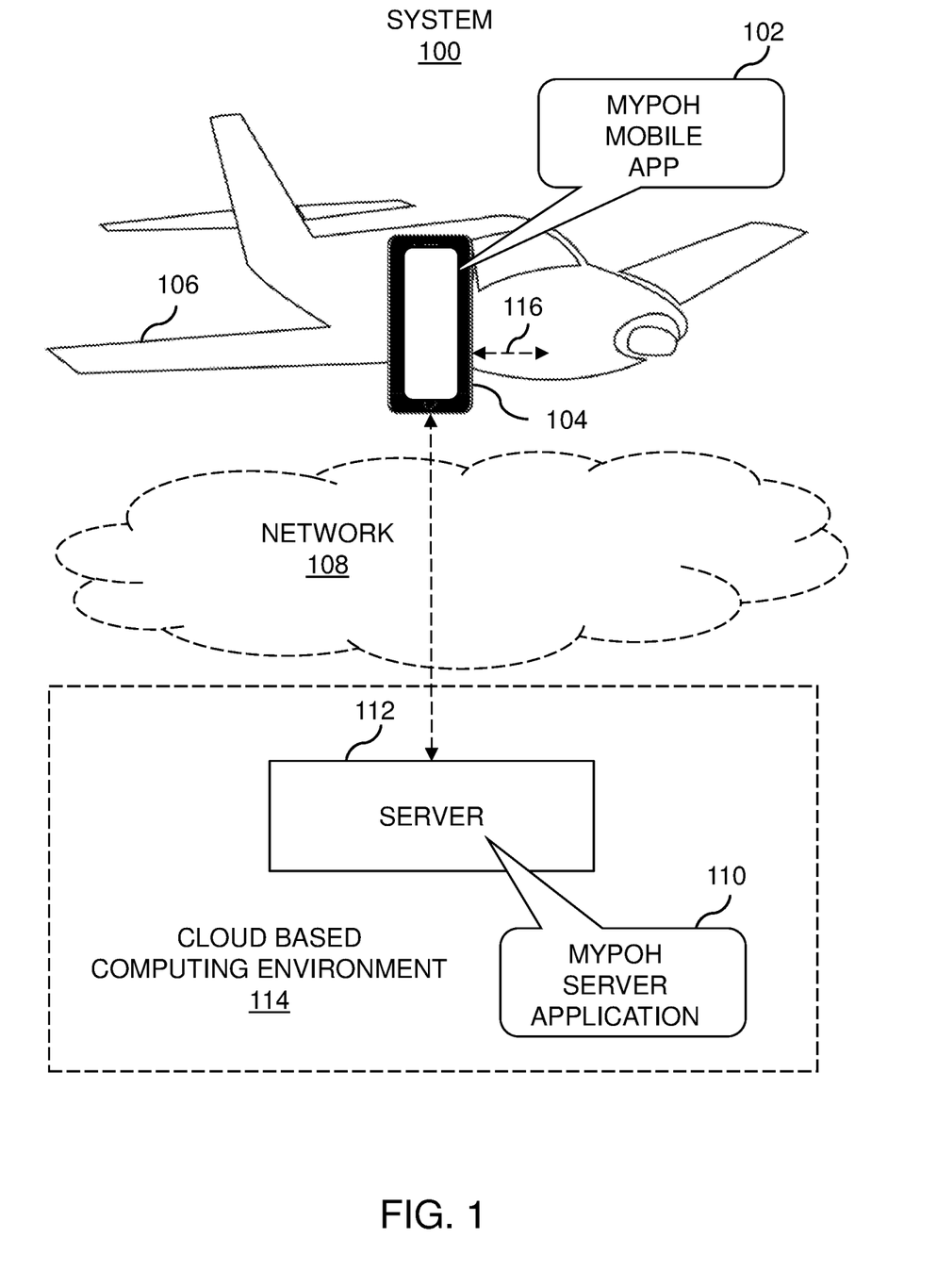
FIG. 1 depicts a diagram illustrating a system including a mobile computing device and a server for solving the problem of facilitating pilots in determining current and predicted performance specifications of their aircraft in accordance with embodiments of the present disclosure.

FIG. 1 depicts a diagram illustrating a system 100 for solving the problem of facilitating pilots in determining current and predicted performance specifications of their aircraft in accordance with embodiments of the present disclosure. The system 100 includes a myPOH mobile application 102 executing on a mobile computing device 104 within an aircraft 106. The myPOH mobile application 102 may be an iOS® app, an Android® OS app, or the like. The mobile device 104 may be a smart phone, a smart tablet, or the like. For example, the mobile computing device 104 may be an iPhone®, an iPad®, or a mobile computing device that includes a version of an Android® operating system (OS). The mobile computing device 104 may also be any computing device capable of being transported easily from a one location to another location without undue difficulty and one that is capable of functional connection with the server 112 during and/or after a flight.

The aircraft 106 may be a type of aircraft used in general aviation. For example, the aircraft 106 may be a single-engine aircraft, a multi-engine piston aircraft, a turboprop aircraft, a turbojet aircraft, a helicopter, a glider, an experimental aircraft, or the like. In other embodiments, the aircraft 106 may be a commercial aircraft, a military aircraft, and/or a drone. The mobile computing device 104 may be associated with a pilot or a passenger of the aircraft 106. The mobile computing device 104 may also be provided by an owner and/or rental agency associated with the aircraft 106. The mobile computing device 104 may be positioned with a smart device cradle (not shown in FIG. 1) within the aircraft 106. The smart device cradle may be in a known fixed position relative to at least one of a yaw axis, a pitch axis, and a roll axis of the aircraft 106.

The mobile computing device 104 is configured to communicate over a network 108 with a myPOH server application 110. The myPOH server application 110 is executing on a server 112 within a cloud based computing environment 114. The network 108 may include any combination of 2G, 3G, 4G, and 5G networks. The network 108 may also be an internet protocol (IP) network. The myPOH mobile application 102 is configured for determining aircraft performance data based on static aircraft data (i.e. known data associated with the aircraft 106) and dynamic aircraft data recorded from a plurality of sensors embedded within the mobile computing device 104 during one or more portions of a flight. At least a portion of the dynamic aircraft data may be received over a personal area network (PAN) 116 from an aviation navigation system embedded within the aircraft and/or other mobile high performance sensor device (not shown if FIG. 2). In other embodiments, a wireless local area network (WLAN) may be used instead of the PAN 116. For example, weather and/or wide area augmentation system (WAAS) GPS data may be provided by an automatic dependent surveillance-broadcast ADS-B receiver or the like. Other systems providing dynamic aircraft data may include GDL-90 enabled devices. These portions may include a takeoff, a descent, a final approach, and/or a landing. The myPOH mobile application 102 may use the aircraft performance data to predict takeoff distances including ground roll and distance to clear a 50-foot obstacle. Additionally, myPOH mobile application 102 may predict climb duration, climb speed, distance traveled, cruise speeds, and/or the like. Additional data predicted may include maximum angle of climb (AOC), maximum rate of climb (ROC), specific endurance, specific range, and/or the like. Specific endurance may be presented as flight hours per pound of fuel and/or the reciprocal of fuel flow. Specific range may be presented as nautical miles per pound of fuel and/or knots per fuel flow. Graphs may also be presented including effect of wind on takeoff, effect of wind on landing, power versus speed at different altitudes, and/or the like. The myPOH mobile application 102 may use temperature, atmospheric pressure, pressure altitude, density altitude, weight (including aircraft, persons, and cargo), wind conditions, and/or the like. A single instance of the myPOH mobile application 102 may be used with different aircraft and different pilots. Separate profiles may be maintained for each aircraft and for each pilot. Additionally, the myPOH mobile application 102 may be configured to receive dynamic pilot data (not shown if FIG. 1) from a wearable health monitoring device associated with a pilot of the aircraft 106. The aircraft performance is stored for future reference with the myPOH mobile application 102, the myPOH server application 110, and/or a database (not shown in FIG. 1). The myPOH server application 110 and/or the database may be used to store recorded and/or predicted data with other pilots and aircraft.

Figure 2:
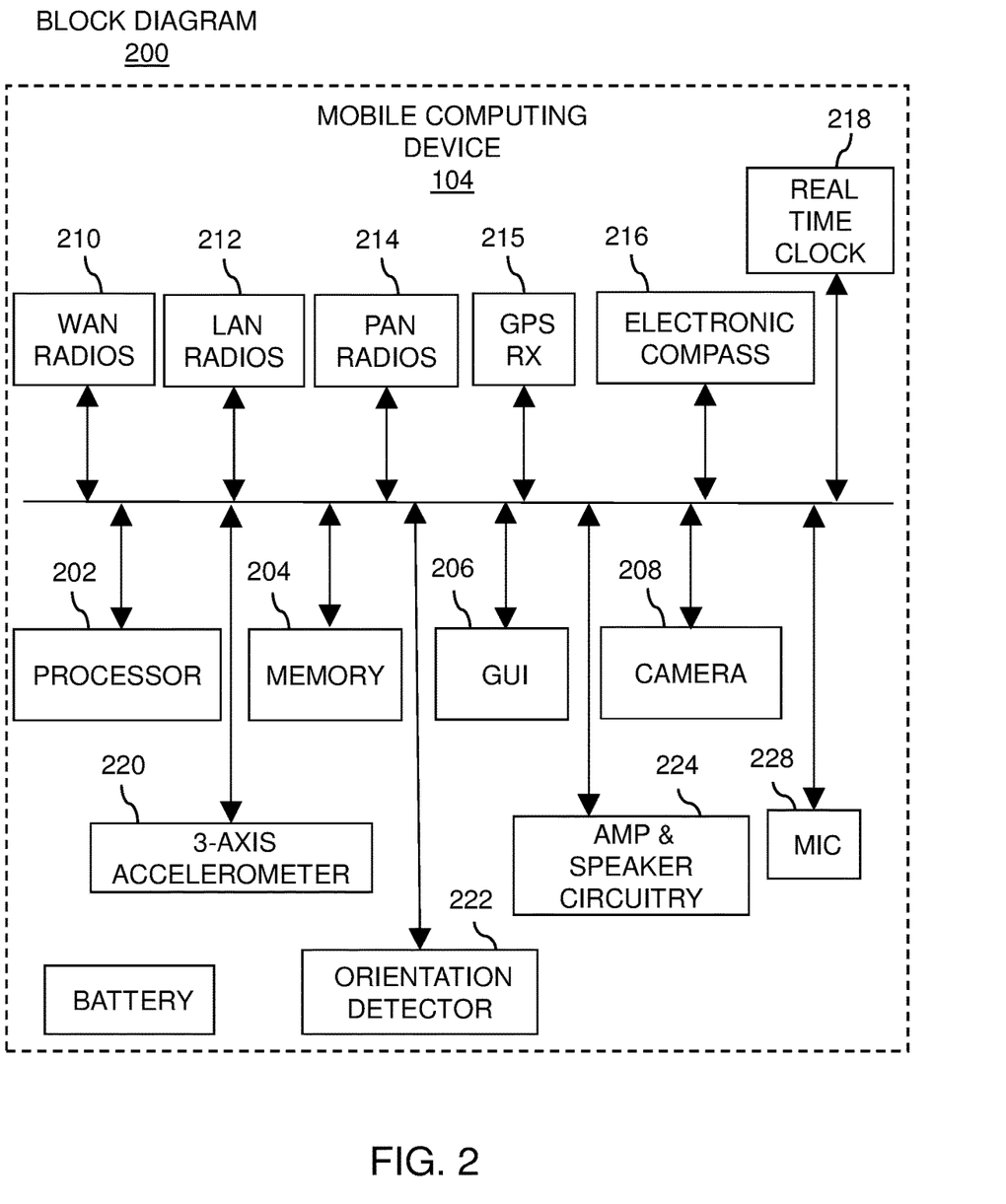
FIG. 2 depicts a block diagram illustrating the mobile computing device of the system of FIG. 1 in accordance with embodiments of the present disclosure.

FIG. 2 depicts a block diagram 200 illustrating the mobile computing device 104 of the system 100 of FIG. 1 in accordance with embodiments of the present disclosure. The mobile computing device 104 includes at least a processor 202, a memory 204, a graphical user interface (GUI) 206, a camera 208, WAN radios 210, LAN radios 212, and PAN radios 214.

In some embodiments, the processor 202 may be a mobile processor such as the Qualcomm® Snapdragon™ mobile processor. The memory 204 may include a combination of volatile memory (e.g. random access memory) and non-volatile memory (e.g. flash memory). The memory 204 may be partially integrated with the processor 202. The GUI 206 may be a touchpad display. The WAN radios 210 may include 2G, 3G, 4G, and/or 5G technologies. The LAN radios 212 may include Wi-Fi technologies such as 802.11a, 802.11b/g/n, 802.11ac, 802.11.ax or the like circuitry. The PAN radios 214 may include Bluetooth® technologies.

The mobile computing device 104 also includes a global positioning system (GPS) receiver 215 for determining current location data, a real time clock 218 for timestamping dynamic aircraft data, a three-axis accelerometer 220, an orientation detector 222, amplifier/speaker circuitry 224, a microphone 226, and a battery 228. The mobile computing device may also include a barometric pressure sensor (not shown in FIG. 2). The barometric pressure sensor may be used to determine an altitude of the aircraft 106. In other embodiments, the mobile computing device may be configured to receive barometric data from the wearable health monitoring device previously described.

In other embodiments, the mobile computing device 104 may be configured for installation within a cockpit of the aircraft 106. The mobile computing device 104 may also be at least a portion of an aircraft navigation system. In still further embodiments, the method may further include receiving at least a portion of the dynamic aircraft data over an internal communication bus within the aircraft 106.

The internal communication bus may be compliant with at least one version of a Controller Area Network (CAN) data bus standard, an ARINC 429 standard, an ARINC 629 standard, a MIL-STD-1553 standard, a Commercial Standard Digital Bus (CSDB) standard, an Avionics Serial Communication Bus (ASCB) standard, or the like. In certain embodiments, the internal communication bus may be an optical communication bus.

Figure 3:
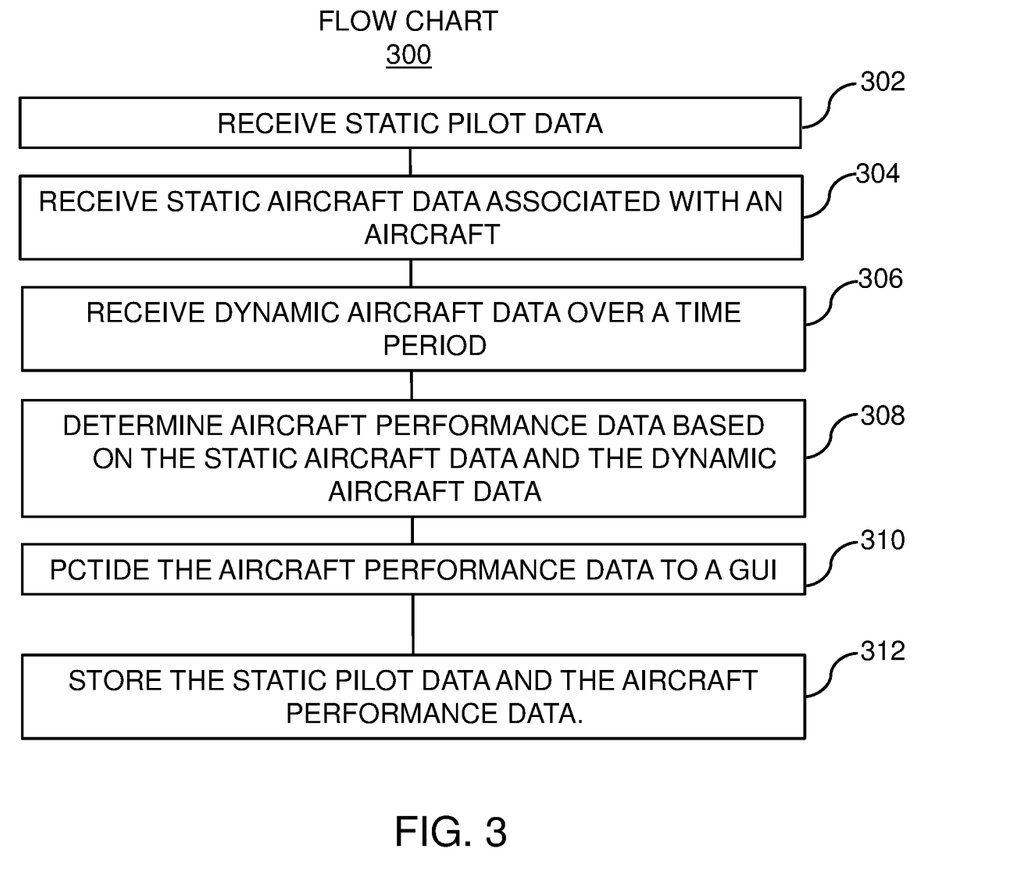
FIG. 3 depicts a flow chart illustrating a method implemented on the mobile computing device of the system of FIG. 1 and the block diagram of FIG. 2 in accordance with embodiments of the present disclosure.

FIG. 3 depicts a flow chart 300 illustrating a method implement on the mobile computing device 104 of the system 100 of FIG. 1 and block diagram 200 of FIG. 2 in accordance with embodiments of the present disclosure. The method facilitates a pilot in determining performance levels of the aircraft 106.

In step 302, the method includes receiving static pilot data. The static pilot data may include a pilot name and logged flight hours. Additionally, the static pilot data may include age, sex, weight, and/or other health related data. The static pilot data may be provided by the GUI 206 associated with the mobile computing device 104. In other embodiments, the static pilot data may be provided by the server 112 over the network 108. Additionally, the static pilot data may include other information about a flight. For example, number of passengers, passenger weight, luggage weight, current airport, destination airport, and/or the like.

In step 304, the method further includes receiving static aircraft data associated with an aircraft 106. The static aircraft data may be provided by the GUI 206 associated with the mobile computing device 104 (e.g. pilot). In other embodiments, the static aircraft data may be provided by server 112 over the network 108. The static aircraft data may include aircraft manufacturer, aircraft model number, year manufactured, engine hours, modifications since manufacture, and/or the like.

In step 306, the method further includes receiving dynamic aircraft data over a time period. The mobile computing device 104 may be in a fixed position relative to a yaw axis, a pitch axis, and/or a roll axis of the aircraft 106 during the time period. The dynamic aircraft data may be provided by a plurality of mobile device sensors (e.g. see FIG. 2) embedded in the mobile computing device 104. For example the dynamic aircraft data may include timestamped samples of GPS data, electronic compass data, three-axis accelerometer data, orientation detector data, microphone data, camera data, and/or the like. In some embodiments a portion of the dynamic aircraft data may be provided by a PAN connection to an aviation navigation system embedded within the aircraft 106. In other embodiments, a portion of the dynamic aircraft data may be provided by a mobile high performance sensor device via a PAN connection.

Additionally, weather data may be received by the mobile computing device 104 over the network 108. The weather data may include current conditions. For example, the weather data may include temperature, humidity, wind speed, wind direction, pressure, and/or the like. Additionally, the weather data may include forecasted weather data associated with the time period. The weather data may be for the takeoff location and/or the intended landing location of the aircraft 106. The weather data may be further provided by a National Weather Service application programming interface (API), an OpenWeatherMap API, a Weatherbit API, an AccuWeather API, a Dark Sky API, a Weather2020 API, a ClimaCell API, a Visual Crossing API, a AerisWeather API, and/or the like. The weather data may be provided directly to myPOH mobile application 102 or relayed via the myPOH server application 110 via the network 108.

In step 308, the method further includes determining aircraft performance data based on the static aircraft data and the dynamic aircraft data. Additionally, airport data and/or the weather data may be used in determining the aircraft performance data. The airport data may be provided by the GUI 206 associated with the mobile computing device 104. In other embodiments, the airport data may be provided by the server 112 over the network 108. The airport data may be requested based on a current location of the mobile computing device 104, wherein the current location data may be provided by the GPS receiver 215 embedded within the mobile computing device. The aircraft performance data may include pitch data, yaw data, roll data, rate of climb data, rate of descent data, velocity data, altitude data, and/or the like over the time period In step 310, the method further includes providing the aircraft performance data to the GUI 206 associated with the mobile computing device 104.

In step 312, the method further includes storing the static pilot data and the aircraft performance data within the memory 204 on the mobile computing device 104, within memory on the server 112, and/or another remote database.

The method (not shown in FIG. 3) may also include determining the aircraft performance data further based on the dynamic pilot data. The dynamic pilot data may be provided in near real time by a wrist based wearable health monitoring device over a PAN connection. The dynamic pilot data may include pilot heart rate data, pilot heart rate variability (HRV) data, pilot skin perspiration data, pilot skin temperature data, pilot oxygen saturation data, pilot wrist based orientation data, pilot wrist based position three axis accelerometer data, and or the like.

Wherein the mobile computing device 104 is configured for installation within a cockpit of the aircraft 106, the method may further include receiving at least a portion of the dynamic aircraft data over an internal communication bus within the aircraft 106.

Additionally, the method may include determining turbulence data based on one or more sensors in the mobile computing device 104 and/or other locations within the aircraft 106. The turbulence data may be determined via data from the three-axis accelerometer 220 over the time period. The turbulence data may also be determined by estimating vertical wind over the time period using pitch angle data, roll angle data, and angle of attack data. The turbulence data may include eddy dissipation rate (EDR) data. The turbulence data may be included with the aircraft performance data. The turbulence data may also include quantitative turbulence data and/or qualitative turbulence data. Additionally, the turbulence data may include turbulence location data.

The method may further include providing the turbulence data to a remote server over a WAN (e.g., the network 106). The remote server may be the server 112 of FIG. 1. The remote server may be configured for receiving a plurality of turbulence datasets from a plurality of aircraft and generating turbulence mapping data in near-real-time associated with the plurality of turbulence datasets. The method may further include receiving the turbulence mapping data and displaying the turbulence mapping data on the GUI 206 of the mobile computing device 104.

Additionally, the method may include determining wind data over the time period based on one or more sensors within the aircraft 106. The wind data may be included with the aircraft performance data. The wind data may be determined using true air speed data and ground speed data. Ground speed data may be determined by GPS data. True air speed data may be determined from dynamic pressure data via static pressure data and total pressure data received from one or more pitot tubes and a compass on the aircraft 106. The wind data may include wind speed data and wind direction data. The wind data may also include quantitative wind data and/or qualitative wind data. Additionally, the wind data may include wind location data.

The method may further include providing the wind data to a remote server over a WAN (e.g., the network 106). The remote server may be the server 112 of FIG. 1. The remote server may be configured for receiving a plurality of wind datasets from a plurality of aircraft and generating wind mapping data in near-real-time associated with the plurality of wind datasets. The method may further include receiving the wind mapping data and displaying the wind mapping data on the GUI 206 of the mobile computing device 104.

Figure 4:
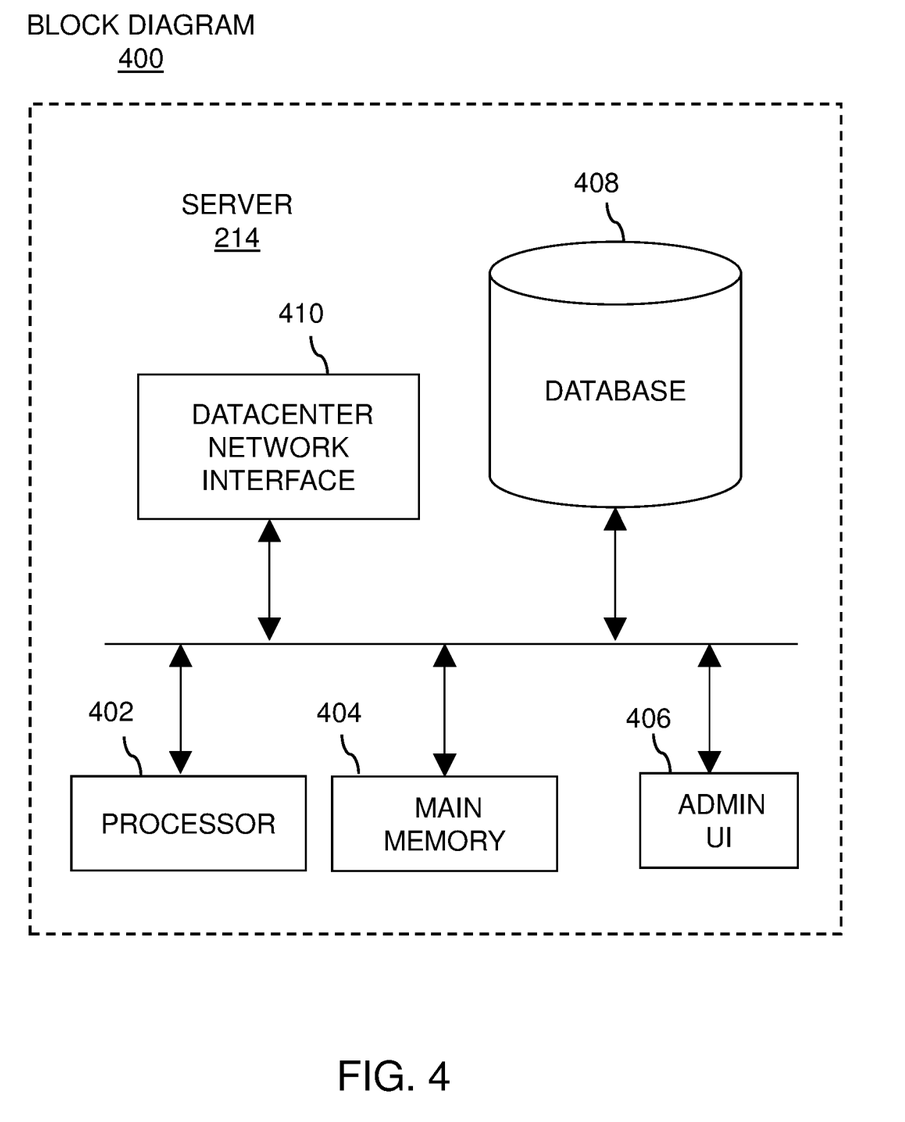
FIG. 4 depicts a block diagram illustrating the server of the system of FIG. 1 in accordance with embodiments of the present disclosure.

FIG. 4 depicts a block diagram 400 illustrating the server 112 of the system 100 of FIG. 1 in accordance with embodiments of the present disclosure. The server 112 may include at least one of processor 402, a main memory 404, an administration user interface (UI) 406 a database 308, and a datacenter network interface 410. The server 112 may be configured to host an Ubuntu® server. In some embodiments the Ubuntu® server (or other virtual server) may be distributed over a plurality of hardware servers using hypervisor technology. The processor 402 may be a multi-core server class processor suitable for hardware virtualization. The processor 402 may support at least a 64-bit architecture and a single instruction multiple data (SIMD) instruction set. The main memory 404 may include a combination of volatile memory (e.g. random access memory) and non-volatile memory (e.g. flash memory). The database 408 may include one or more hard drives. The database 408 may be an open source database such as the MongoDB® database, the PostgreSQL® database, or the like. The datacenter network interface 410 may provide one or more high-speed communication ports to data center switches, routers, and/or network storage appliances. The datacenter network interface 410 may include high-speed optical Ethernet, InfiniBand (IB), Internet Small Computer System Interface (iSCSI), and/or Fibre Channel interfaces. The administration UI 406 may support local and/or remote configuration of the server 112 by a datacenter administrator.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product (e.g. the myPOH mobile application 102 of FIG. 1) embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including object oriented and/or procedural programming languages. Programming languages may include, but are not limited to: Ruby, JavaScript, Java, Python, Ruby, PHP, C, C++, C#, Objective-C, Go, Scala, Swift, Kotlin, OCaml, or the like. The program code may execute entirely on the user's computer, partly on the user's computer, as a stand-alone software package, partly on the user's computer, and partly on a remote computer or entirely on the remote computer or server.

Aspects of the present invention are described in the instant specification with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. Thus, for example, reference to "a user" can include a plurality of such users, and so forth. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method implemented on a mobile computing device, the method comprising:
    receiving static pilot data;
    receiving static aircraft data associated with an aircraft;
    receiving dynamic aircraft data over a time period;
    determining aircraft performance data based on the static aircraft data and the dynamic aircraft data;
    providing the aircraft performance data to a graphical user interface (GUI) associated with the mobile computing device; and
    storing the static pilot data and the aircraft performance data.

2. The method of claim 1, wherein mobile computing device is at least one of a smart phone and a smart tablet.

3. The method of claim 1, wherein the static pilot data is provided by a remote server over a wide area network (WAN).

4. The method of claim 1, wherein the static aircraft data is provided by a remote server over a wide area network (WAN).

5. The method of claim 1, wherein the mobile computing device is in a fixed position relative to a yaw axis, a pitch axis, and a roll axis of the aircraft during the time period.

6. The method of claim 1, wherein the aircraft performance data comprises pitch data, yaw data, and roll data over the time period.

7. The method of claim 1 wherein the aircraft performance data comprises velocity data and altitude data over the time period.

8. The method of claim 1 wherein the aircraft performance data comprises at least one of rate of climb data and rate of descent over the time period.

9. The method of claim 1 further comprising receiving weather data associated with the time period and further based on the weather data.

10. The method of claim 1 further comprising receiving airport data and determining the aircraft performance data is further based on the airport data.

11. The method of claim 1, wherein a first portion of the dynamic aircraft data is provided by a plurality of mobile device sensors embedded in the mobile computing device and a second portion of the dynamic aircraft data provided by at least one of a personal area network (PAN) connection and a local area network connection (LAN).

12. The method of claim 11, wherein the second portion of the dynamic aircraft data is further provided by at least one of an aviation navigation system embedded within the aircraft and a mobile high performance sensor device.

13. The method of claim 11, wherein the plurality of mobile device sensors include at least three of a global positioning system (GPS) receiver, an accelerometer, an electronic compass, a barometer, a microphone, and an orientation detector.

14. The method of claim 1 further comprising receiving dynamic pilot data provided in near real time by a wearable health monitoring device and determining the aircraft performance data is further based on the dynamic pilot data.

15. The method of claim 1, wherein the time period is representative of a leg of an entire flight having a plurality of legs and the plurality of legs include a takeoff, a descent, a final approach, and a landing.

16. The method of claim 1 wherein the aircraft performance data comprises turbulence data over the time period and the method further comprises:
    providing the turbulence data to a remote server over a wide area network (WAN), wherein the remote server is configured for:
        receiving a plurality of turbulence datasets from a plurality of aircraft; and
        generating turbulence mapping data in near-real-time associated with the plurality of turbulence datasets;
    receiving the turbulence mapping data; and
    displaying the turbulence mapping data on the GUI.

17. The method of claim 1, wherein the aircraft performance data comprises wind data over the time period and the method further comprises:
    providing the wind data to a remote server over a wide area network (WAN), wherein the remote server is configured for:
        receiving a plurality of wind datasets from a plurality of aircraft; and
        generating wind mapping data in near-real-time associated with the plurality of wind datasets;
    receiving the wind mapping data; and
    displaying the wind mapping data on the GUI.

18. The method of claim 1, wherein the mobile computing device is configured for installation within a cockpit of the aircraft and the method further includes receiving at least a portion of the dynamic aircraft data over an internal communication bus within the aircraft.

19. A mobile computing device comprising
    a memory; and
    a processor electrically coupled with the memory, processor configured for:
        receiving static pilot data;
        receiving static aircraft data associated with an aircraft;
        receiving dynamic aircraft data over a time period;
        determining aircraft performance data based on the static aircraft data and the dynamic aircraft data;
        providing the aircraft performance data to a graphical user interface (GUI) associated with the mobile computing device; and
        storing the static pilot data and the aircraft performance data.

20. A non-transitory computer readable medium comprising a plurality of machine-readable instructions which when executed by one or more processors of a mobile computing device are adapted to cause the mobile computing device to perform a method, the method comprising:
    receiving static pilot data;
    receiving static aircraft data associated with an aircraft;
    receiving dynamic aircraft data over a time period;
    determining aircraft performance data based on the static aircraft data and the dynamic aircraft data;
    providing the aircraft performance data to a graphical user interface (GUI) associated with the mobile computing device; and
    storing the static pilot data and the aircraft performance data.

* * * * *

UNITED STATES PATENT AND TRADEMARK OFFICE
CERTIFICATE OF CORRECTION

| | |
|---|---|
| PATENT NO. | : 11,987,379 B2 |
| APPLICATION NO. | : 17/816025 |
| DATED | : May 21, 2024 |
| INVENTOR(S) | : Chris Rowan |

It is certified that error appears in the above-identified patent and that said Letters Patent is hereby corrected as shown below:

On the Title Page

Under Related U.S. Application Data:
Add item --(60) Provisional application No. 63/226,880, filed on Jul. 29, 2021.--

Signed and Sealed this
Twenty-fifth Day of June, 2024

*Katherine Kelly Vidal*

Katherine Kelly Vidal
*Director of the United States Patent and Trademark Office*